United States Patent [19]

Chambers

[11] 4,030,984
[45] June 21, 1977

[54] SCRAP-TIRE FEEDING AND COKING PROCESS

[75] Inventor: Ren W. Chambers, Newport Beach, Calif.

[73] Assignee: Deco Industries, Irvine, Calif.

[22] Filed: June 12, 1975

[21] Appl. No.: 586,265

[52] U.S. Cl. .................................... 201/25; 201/2.5; 201/16; 201/32; 202/118; 202/262; 260/2; 260/3; 264/37

[51] Int. Cl.² ................. C10B 47/20; C10B 51/00; C10B 57/04; C10B 57/08

[58] Field of Search ................ 201/2, 5, 8, 16, 25, 201/32, 35; 202/118, 137, 145, 262; 126/122–125, 343.5 A; 208/8; 110/18 R; 423/449; 252/421; 23/280, 290, 290.5, 308 R; 432/161; 264/37; 260/710, 720, 2.3

[56] References Cited

UNITED STATES PATENTS

| 1,606,380 | 11/1926 | Pagenkoff | 423/449 |
|---|---|---|---|
| 3,020,212 | 2/1962 | Lantz | 202/118 |
| 3,362,887 | 1/1968 | Rodgers | 201/2.5 |
| 3,376,202 | 4/1968 | Mescher | 201/35 |
| 3,642,451 | 2/1972 | Feja et al. | 23/280 |
| 3,644,131 | 2/1972 | Gotshall | 106/307 |
| 3,772,242 | 11/1973 | Liska et al. | 252/421 |
| 3,787,292 | 1/1974 | Keappler | 202/118 |
| 3,822,218 | 7/1974 | Whittaker et al. | 423/449 |
| 3,875,077 | 4/1975 | Sanga | 201/2.5 |

OTHER PUBLICATIONS

Fraser; "Comparison Of ... Thermal Process"; Transactions, IRI, vol. 19; 1944; pp. 180–190.
Wolfson et al.; "Destructive Distillation Of ... Tires"; Dept. Of Int., Bureau Of Mines; pp. 1–19; 1969.

Primary Examiner—Morris O. Wolk
Assistant Examiner—Bradley Garris
Attorney, Agent, or Firm—Lyon & Lyon

[57] ABSTRACT

A process and apparatus for feeding scrap tires into a reactor for the recovery of carbonaceous raw materials. The process comprises suspending the tires in a melt chamber having hot gases flowing therethrough at between 250° F and 600° F, allowing the hot gases to flow past the tires, melting the carbonaceous material therein, the melted material being fed into a reactor tube which converts the material to carbonaceous raw materials. The non-meltable portions of the scrap tires, such as metal beads or belted reinforcement, are separated in the melt chamber from the melted scrap tires.

5 Claims, 3 Drawing Figures

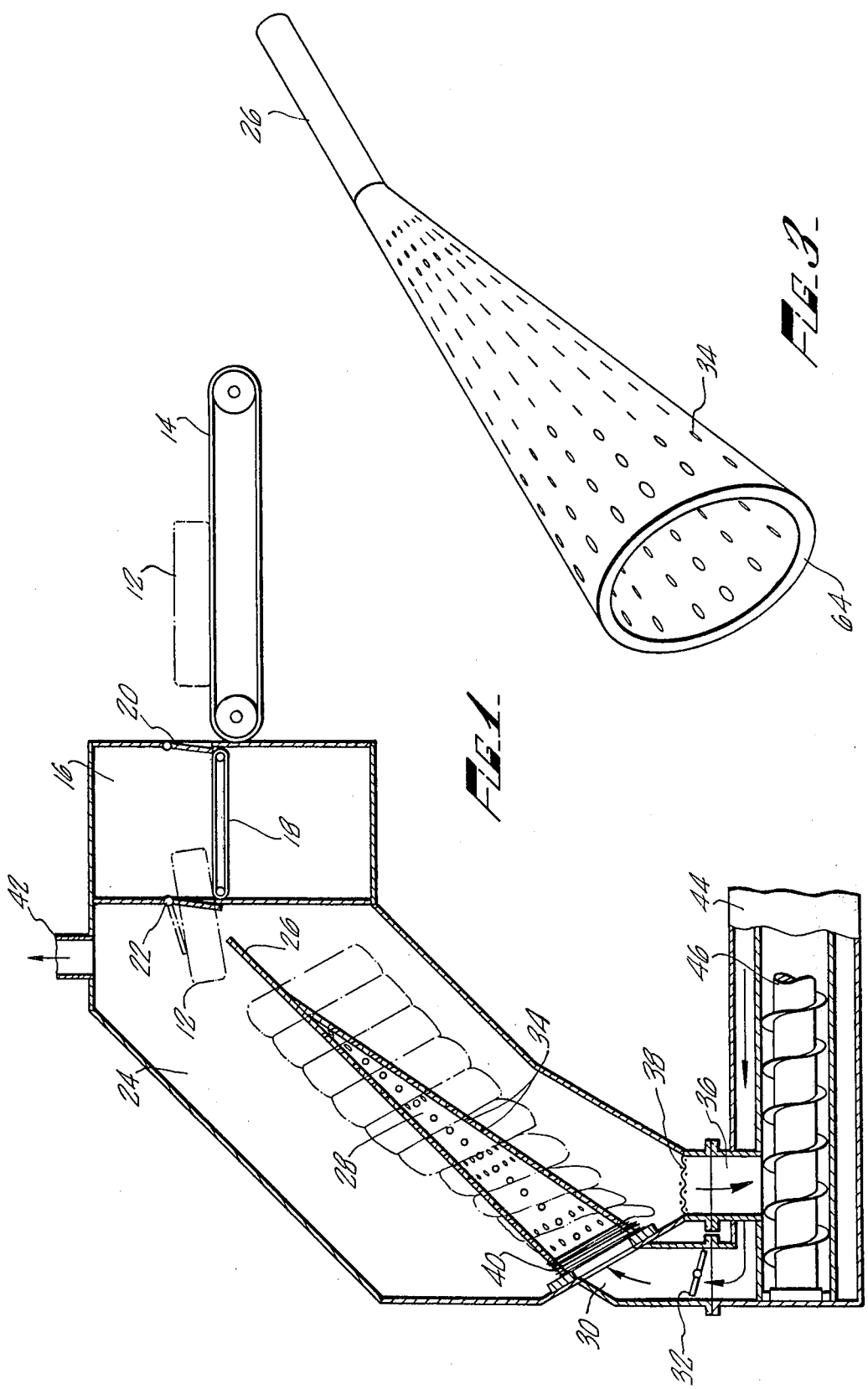

SCRAP-TIRE FEEDING AND COKING PROCESS

BACKGROUND OF THE INVENTION

The present invention relates to the recovery and/or production of liquid and gaseous hydrocarbons from used scrap tires, and more particularly relates to the processing of scrap tires such that shredding or pulverizing is not required.

A number of processes for the conversion of carbonaceous containing materials into gas and oil for energy consumption have been disclosed. Many of these processes are concerned with the conversion of coal into natural gas and oil products. Also contemplated for conversion are numerous carbonaceous containing waste material, including municipal and industrial waste.

For a more detailed discussion of various processes for the conversion of carbonaceous materials into gaseous fuels, see my co-pending applications, "Apparatus and Method for Producing High Carbon Char, Gaseous Fuels, and Oil from Coal and Like Materials", Ser. No. 548,498, filed Feb. 10, 1975, and "Coal and Carbonaceous Material Converting Process", Ser. No. 573,012, filed Apr. 30, 1975, and both assigned to the same assignee as the present invention. And, disclosed in my co-pending application Ser. No. 558,599, filed Mar. 14, 1975, "Method and Apparatus for Obtaining Hydrocarbons from Rubber Tires and Waste Plastic Materials" is a process for the production of hydrocarbon gas from waste, rubber and plastic materials.

The processes disclosed in my previously filed applications for the conversion of various carbonaceous materials to high energy fuels, are processes which operate at sub-atmospheric pressure, and at relatively low temperatures. In these processes large amounts of volatilization but little chemical reaction takes place, especially since it is in the absence of gaseous reactants such as oxygen. It is believed that by shock heating carbonaceous materials, the hydrocarbons contained therein will volatilize at the interior and displace the liquidized hydrocarbons at the surface. The amount of hydrocarbon gas which can be drawn out of the particles is a function of the gas-solid or solid-liquid interparticle diffusion which occurs. This gaseous diffusion is greatly enhanced by shock heating the particles at sub-atmospheric pressure while mechanically agitating the particles to maximize the surface area through which the gas diffuses.

It is believed that through mechanical agitation and by means of the sub-atmospheric pressure, the diffusing gaseous materials are removed from the carbonaceous particles before they have a chance to repolymerize to more stable, high molecular weight, hydrocarbon solids.

As disclosed in my previously referenced copending application, "Coal and Carbonaceous Materials Converting Process", filed Apr. 30, 1975, Ser. No. 573,012, by burning a portion of the non-volatile component obtained as a by-product of the conversion process, the process may be utilized without resort to an outside energy source. Thus, where there is no requirement for outside energy, the cost of recovering the raw gases and oil is dictated by the cost of the starting material. With respect to scrap materials, such as scrap tires, almost all of the cost is in transporting and feeding the tires into the reaction vessel in a usable form.

The amount of rubber tires discarded as scrap every year in the United States is upward of 3 million tires per year. These scrap tires represent a tremendous source of cheap raw materials for conversion into hydrocarbon gases and oils, which in turn may be utilized as an energy source or as a basic raw material for the production of new rubber and plastic products. Unfortunately, the use of such scrap tires as a source of carbonaceous material has been limited on account of the expense of pre-treating the tires so they can be fed into a conversion process. In the past, such scrap materials have been pre-treated by shredding, pulverizing or by other similar grinding means to render the tire suitable for feeding into a reactor vessel. Compounding the problem with respect to scrap tires, is the wide use of metal reinforcing belts, as well as metal rings around the bead portions of the tires. These non-rubber materials must be removed prior to pulverizing or shredding since if they are not removed, they will result in large build ups of metallic deposits in the rubber conversion processor.

The cost of separating the metal from the nonmetal components of the scrap tire, as well as the cost of pulverizing, shredding or grinding the tires, has made an otherwise ecomically attractive and plentiful raw material commercially prohibitory. It is thus an object of this invention to provide an apparatus and method for feeding scrap tires into a carbonaceous material converting process which does not require the shredding or pulverizing of the tires.

It is another object of this invention to provide a method of feeding metal reinforced tires into a carbonaceous converting process whereby the metal portion of the tire is automatically separated without additional steps.

It is another object of this invention to provide a scrap tire feeding and conversion process which does not require an outside energy source.

SUMMARY OF THE INVENTION

These and other objects are accomplished by feeding the scrap tires into a melt chamber having a suspending means for suspending the tires in the flow path of hot gases. As the tires move along the suspending means, the hot gases flow past the tires and cause the carbonaceous materials in the tires to melt. The non-meltable metal reinforcing portions of the tires are maintained on the suspending member, while the melted portions drop through an outlet port into the reactor vessel.

Large portions of the carbonaceous containing tire material may be separated from the metallic portions of the tire by allowing hot gases between 250° F and 600° F to flow past the tires. Further, char by-products obtained from the conversion process itself may be utilized to heat the melt chamber, thereby providing a process which does not require an outside energy source.

BRIEF DESCRIPTION OF THE DRAWINGS

FIG. 1 depicts the scrap tire melt chamber of this invention, into which the scrap rubber tires are fed and then melted.

FIG. 2 shows the horizontal reactor into which the melted rubber passes and is processed to yield volatile hydrocarbons and char.

FIG. 3 is a perspective view of the cone suspending member onto which the tires are positioned and melted.

DESCRIPTION OF THE EMBODIMENT

Figure 12:
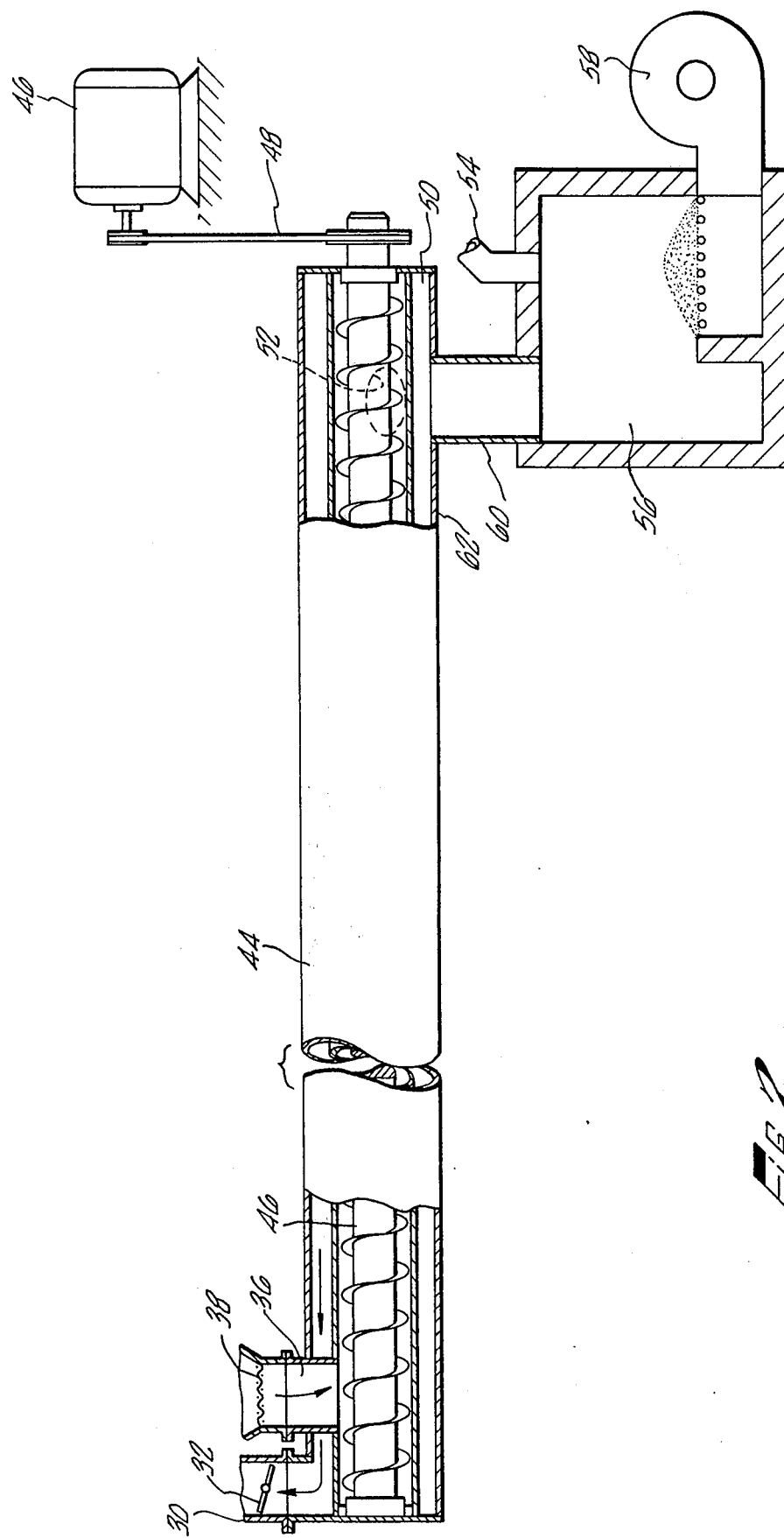

Referring to FIG. 1, scrap tires 12 are fed along tire conveyor 14 into chamber 16. Conveyor 18 in chamber 16 is timed so that entrance door 20 is closed while exit door 22 opens and visa versa. This permits the maintenance of heating chamber 24 at a somewhat positive pressure as well as minimizing heat loss. As the scrap tires are fed through door 22 into heating chamber 24, they are caught by rod 26 protruding from the cone-shaped suspending member 28. Heating and suspending member 28 is connected to a gas outlet 30. A baffle 32 maintains the flow of gas into member 28 at such a rate that the gas in the heating chamber is maintained at approximately 250° to 600° F and preferably from 350° to 450° F. Baffle 32 is controlled via temperature sensors, not shown, within the melting chamber. The gas passing through passage 30 is preferably obtained from the burning of the char residue, which will be discussed with reference to FIG. 2.

The scrap tires, as they fall upon cone member 28, move down the cone. The number of tires fed into chamber 28 is controlled by starting and stopping conveyor 18. Generally, at a temperature range of 350° to 450° F, approximately 10 minutes is required to melt a substantial portion of the tire. The hot gases which flow into the base of cone member 28, flow out the surface through a plurality of holes shown at 34, the gas then flowing past the tires suspended on the cone and finally out stack 42. As the tires move further and further down the cone, more and more of the meltable material falls and passes into the reactor chamber at 36. A coarse screen, 38, may optionally be used to remove extremely large globuls of tire material, generally in the order of two inches or larger. As more and more of the tire melts, what remains on the cone at or near the base, are non-meltable materials such as the metal belts or bead materials, generally shown at 40. Periodically, the non-meltable materials at 40, as well as the large particle materials which did not pass through screen 38, are removed from the chamber. As previously discussed, through the continual pumping of gas into the chamber and the closed feed chamber 16, the melting chamber is maintained at a positive pressure.

Referring now to FIG. 2, the melted tire particles pass through chamber 36 which is maintained at a temperature between 600° F and 1800° F. Large variations in particle sizes may be accomodated by this reaction vessel. It is not necessary that all of the rubber be in a homogeneous melted state. Large amounts of solid carbonaceous particles which have fallen from the tire suspending member may be processed in the reaction chamber shown in FIG. 2. Screen 38 may optionally be employed, and is generally utilized where large amounts of a non-carbonaceous material may drop with the melted portion of the tire.

The horizontal reactor tube 44 is preferably made of stainless steel and a screw conveyor 46 is utilized to move the tire particles through the horizontal conveyor at a uniform rate of speed with a churning or stirring movement. This movement maximizes the surface area through which volatile gases may diffuse. The screw conveyor may be driven by any suitable mechanical means, such as via electric motor 47 attached to pulley 48.

At the outlet end of horizontal tube 44 is a gas outlet 50 through which the volatiles are removed via vacuum. Also at that end of the horizontal tube, through outlet 52 is removed non-volatile char particles. The char from outlet 52 may be further processed as described in my co-pending application, Ser. No. 573,012, "Coal and Carbonaceous Material Converting Process". However, a portion of the char may be fed through outlet 54 for burning in furnace 56. The furnace produces hot gas for heating of the reactor tube 44 and the melting chamber 24 shown in FIG. 1. The hot gases are blown via blower 58 through inlet pipe 60 along gas passages 62 for the heating of the reactor tube, and then past baffle 32 for the heating of the tire melt chamber.

The reactor tube 44 is maintained at below atmospheric pressure and preferably at about two to five inches of mercury. As previously discussed, the scrap tire melt chamber itself is maintained at somewhat above atmospheric pressure. The atmosphere in the melt chamber is rich in CO and $CO_2$ from the burned char, but is rather low in free oxygen.

The outlet gas from outlet 50 may be further processed to remove oils and gaseous contaminants. An oil trap may be used to collect high boiling oils, after which the gas is pumped to a water cooling unit and condenser. The remaining oil and other liquid components are separated from the cooled gas with the gas being drawn via vacuum for further processing. The raw gas, after oil separation, is high in hydrocarbons and may be burned as a fuel, or the components may be further separated and utilized as raw materials for the production of petrochemical products.

If the raw gas is to be used as a direct substitute for natural gas, it may then be further purified by a number of known means. For example, the raw gas may be further purified by pumping through a wet gas scrubber to remove residual moisture, after which it may be fed through an absorption tower to remove other gaseous contaminants such as moisture, hydrogen sulphide, ammonia or carbon monoxide.

Referring now to FIG. 3, a perspective of the hollow cone shaped tire holding and melting apparatus as depicted in FIG. 1 is shown. The base portion 64 is welded to the gas duct through which the gas from the burned char particles flow. The gas holes 34 are provided for the passage of gas from the interior of the cone outward past the tires. Elongated rod 26 is provided for insuring that each tire entering the chamber is positioned around the cone. However, the elongated rod need not be provided if the suspending member is so positioned as to insure proper placement of the incoming tires. Other shapes, including a truncated cone, or a non-conical tapered member may also be utilized in accordance with this invention, as long as the member is so positioned as to insure the placement of the incoming tire thereover. Also, the diameter of the member at the base should be equal to or greater than the center hole portion of the tire so that the greatest portion of the melting occurs directly over the reactor feed inlet.

The suspending and heating members as generally shown in FIG. 3 are preferably fabricated from heavy gauge stainless steel, but may also be fabricated from a number of other metals. The cone shaped configuration is ideally suited for retaining circular metal members, such as reinforcing belts, which form a large part on the nonmeltable portion of the scrap tire.

EXAMPLE I

Used scrap tires were processed utilizing the apparatus previously described, in which the melt chamber was maintained at approximately 350° to 450° F and at a positive pressure, and the horizontal reactor tube was maintained at 1100° F and at 6 inches of mercury vacuum. The scrap tires were fed into the processing apparatus at a rate of 3 tons per day.

The yield of light oil, gas and char were as follows:

| | |
|---|---|
| Light Oil | 3 barrels per ton of feed |
| Char | 700 pounds per ton of feed |
| Gas | 19,000 scf per ton of feed |

The quality of the oil, as characterized by its boiling point range was:

| BOILING POINT RANGE (C) | YIELD (WT, %) |
|---|---|
| − 97 | 7.0 |
| 97 − 150 | 9.9 |
| 150 − 190 | 8.1 |
| 190 − 265 | 17.8 |
| 265 − 375 | 31.0 |
| RESIDUE | 26.0 |

The residue, a carbon black type of material has a heating value of 19,500 BTU per pound and is obtained in a very fine powdered form. By further processing of the carbon black residue, using the usual carbon activated techniques, it can be converted to a good absorbent material similar to activated carbon which can be used in gases, air and water purfication. A portion of the residue was burned to heat the melt chamber and reaction vessel.

The gas produced had a composition shown below. This gas contained 55% by volume light molecular weight hydrocarbons and thus had a very high heating value.

| MOLECULE | % BY VOLUME |
|---|---|
| Hydrogen | 6% |
| Nitrogen | 17% |
| Carbon Monoxide | 4% |
| Methane | 20% |
| Carbon Dioxide | 5% |
| Ethane | 7% |

-continued

| MOLECULE | % BY VOLUME |
|---|---|
| Propane and Higher Hydrocarbons | 28% |

What is claimed is:

1. A process of feeding scrap tires into a reactor for the recovery of carbonaceous raw materials comprising:
    suspending the intact tires in a melt chamber on a cone shaped suspending member, the hollow center portion of said tires being positioned over the apex of said cone shaped member and
    said tires moving down said member during melting, said chamber having substantially inert hot gases flowing therethrough;
    allowing the hot gases to flow past said tires melting the carbonaceous material;
    feeding the melted carbonaceous material into a reactor tube which converts the material to volatile hydrocarbons;
    collecting in the melt chamber the non-meltable portions of the scrap tires.

2. The process of claim 1 wherein the hot gas is fed into a hollow base of said cone shaped suspending member and out and past said tires through openings along the surface of said member.

3. A process of feeding scrap tires into a reactor for the recovery of carbonaceous raw materials comprising:
    feeding the intact tires into a melt chamber having a cone shaped suspending member;
    positioning the hollow, center portion of said tires over the apex of said cone shaped suspending member, said tires moving down said member during melting;
    feeding substantially inert hot gas maintained at between 250° F and 600° F into a hollow base of said cone shaped suspending member and out past said tires through openings along the surface of said member;
    feeding the melted carbonaceous material into a reactor tube which converts the material to hydrocarbon gases and a char by-product;
    collecting in the melt chamber the non-meltable portions of the scrap tires.

4. The process of claim 3 wherein the hot gas is maintained between 350° F and 450° F.

5. The process of claim 3 wherein the hot gas is obtained from burning of the char by-product produced in the reactor tube.

* * * * *